Patented Dec. 20, 1938

2,140,882

UNITED STATES PATENT OFFICE 2,140,882

WETTING, CLEANING, BLEACHING, FOAMING AND DISPERSIVE AGENTS FOR TEXTILE PURPOSES AND THE LIKE AND APPLICATION OF THE SAME

Meindert Danius Rozenbroek, Delden, Twente, Overijssel, Netherlands, assignor of one-half to Naamlooze Venootschap Chemische Fabriek Servo, Delden, Netherlands, a corporation of the Netherlands No Drawing. Application January 25, 1934, Serial No. 708,332. In the Netherlands January 30, 1933

1 Claim. (Cl. 252—1)

In the textile-, leather- and lacquer-industries various substances are used as additions to the treatment baths for improving the wetting, cleaning, bleaching, foaming and dispersing properties of the same, i. e. organic substances containing a long straight carbon chain provided with a terminal, strongly hydrophilic group, e. g. a sulphuric acid group.

I have found that substances with improved properties can be obtained from fatty acids with a straight chain containing at least six carbon atoms by providing the straight chain of the fatty acid with at least one carbon containing side chain having no strongly hydrophilic character and introducing a strongly hydrophilic group derived from an element of the group consisting of sulphur and phosphorus into the terminal carboxyl group or substituting a sulphonic acid group for the terminal carboxyl group, and the invention relates to treatment baths comprising a treatment liquid and in addition thereto a substance of the character specified.

The fatty acids mentioned above may be saturated or they may contain one or more double or triple bonds. They may also contain one or more hydroxy or amino groups apart from those used for attaching the side chain.

The strongly hydrophilic group can be introduced into the carboxyl group of the fatty acid by combining the same with a hydroxy sulphonic acid or an amino sulphonic acid. The compounds obtained can be represented by formulae such as $RCOOR_1SO_3H$ or $RCONHR_1SO_3H$ in which $R$ and $R_1$ are alkyl groups. The terminal carboxyl group may also be provided with more than one group derived from sulphur or phosphorus.

The carbon containing side chain can be combined either directly or by means of an oxygen or nitrogen atom with a carbon atom of the main chain.

The following are examples of compounds provided with a side chain according to the invention.

1. Compounds in which an alkyl, aryl or aralkyl group is substituted in the main chain.
2. Compounds in which a carboxyl group is linked to a carbon atom of the main chain and a carbon containing group is introduced into the said carboxyl groups e. g. by esterifying the same with a monohydric or polyhydric alcohol or by converting the same into a substituted acid amide.
3. Compounds produced by coupling a carbon atom of the main chain with a compound having a hydrogen atom linked to carbon which may be substituted by alkali metals, e. g. malonic acid esters, tricarballylic acid esters, acetyl acetic acid esters and derivatives of the same.
4. Compounds produced by esterifying or etherifying a hydroxy group attached to a carbon atom of the main chain.
5. Compounds produced by introducing carbon containing groups into an amino group attached to a carbon atom of the main chain.

In all of these cases the side chain may contain various substituents, e. g. hydroxy, oxo or carboxyl groups, nitrogenous groups, etc. provided however that the lipophilic or slightly hydrophilic character of the side chain is maintained.

In general those substances having a side chain with a strong lipophilic character are the most effective. It is therefore advantageous as a rule to convert free hydroxy groups present in the side chain into lipophilic groups, e. g. by esterifying the same with carboxylic acids or etherifying the same with alcohols. For certain purposes however a slightly hydrophilic character of the side chain may be of advantage.

The side chain can be introduced by reacting a halogen compound of the substance with the straight chain with an organic metal compound, especially an alkali or alkaline earth metal compound. Dependent from the materials used the organic radicals of the reacting substances are combined either directly or by means of oxygen or nitrogen.

A side chain attached to the main chain by means of an oxygen atom may also be obtained by acylating compounds with one or more hydroxy groups or amino-groups in the main chain.

A suitable method for manufacturing compounds in which the side chain is attached to the main chain by means of a nitrogen atom consists in introducing into the main chain one or more halogen atoms and treating the halogen compounds with derivatives of ammonia, e. g. amines or substituted amines, diamines, hydroxy and oxo amines, amino carbonic acids and the like.

Another method for providing the main chain with a side chain consists in introducing a carboxyl group into the main chain, e. g. by a nitril synthesis, and introducing organic groups into the carboxyl group, e. g. by esterifying the same with mono- or polyhydric alcohols or amino alcohols or by condensing the same with amines.

The invention will be illustrated by the following examples, in which the manufacture of a number of substances used for the treatment baths according to the invention is described.

Example 1

1 molecule of the dichloro fatty acid of coconut oil is allowed to react with 2 molecules of sodium butylate. This will produce a dibutyl ether of coconut oil fatty acid. The terminal carboxyl group is then condensed with taurine.

Example 2

1 molecule of trichloroleic acid is allowed to react with a little more than 3 molecules of the sodium compound of the monoethylether of glycerol. The free OH-group is esterified with acetic acid; the compound obtained is condensed with isethionic acid.

Example 3

The sodium salt of tetrachloro cetylsulphonic acid is treated with sodium propionate.

Example 4

Hexachlorooleic acid is allowed to react with the sodium compound of octanol 2; the ether fatty acid is then condensed with $$NH_2CH_2CH_2OCH_2CH_2SO_3H$$

or with an aminocarboxyl acid.

Example 5

Hexachloro-oleyl-hydroxyethanesulphonic acid is allowed to react with sodium butylate. The sodium salt of the hexabutyl ether thus obtained is very suitable for oiling woolen yarns.

The oiling process is very uniform, the oiling agent may be easily removed by washing and acts during the washing process as a very effective washing agent.

Example 6

Dibromocetylsulphonic acid is treated under pressure with diluted sodium hydroxide, producing dihydroxycetyl-sulphonic acid. This compound is converted by reaction with butyric acid chloride into the dibutyrylester of cetyl-sulphonic acid and afterwards neutralized.

Example 7

Dichlorecetyl sulphonic acid is treated with potassium cyanide. The nitril thus obtained is saponified and the carboxyl groups are esterified with amylalcohol.

The main chain may also be provided with two or more side chains of a different character, e. g. one or more hydrophilic side chains and at the same time one or more lipophilic side chains. As an example a derivative of dihydroxy stearic acid having one OH-group etherified with butyl alcohol and the other OH-group with glycerol can be mentioned.

Instead of the ordinary alkylates I may also use the alkylates of hydroxy fatty acids, e. g. the di-sodium compound of lactic acid, to the carboxyl-group of which a lipophilic character can be imparted by esterifying the same with amyl alcohol.

Similar compounds may be obtained by dissolving soaps of hydroxy fatty acids, e. g. of dihydroxy stearic acid (by soaps I not only understand alkali but also alkaline earth and other metal soaps) in anhydrous solvents, such as e. g. tetraline, pentanol, xylene or mixtures of the same, adding metallic sodium or sodium alkylate and heating with the same for a long time. The compound thus obtained is then treated with the halogen compound of the alcohol or the polyalcohols.

In the latter case the halogen compounds of the acylated polyalcohols or of the ethers of the polyalcohols may also be used. The carboxyl group is now coupled with taurine, isethionic acid or similar compounds.

I claim:

A treatment bath comprising a treatment liquid and in addition thereto a compound of the general formula

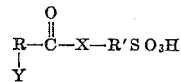

where R is an aliphatic hydrocarbon main chain of at least 6 carbon atoms; Y is a member of the group consisting of R', OR', COR', and NHR', being linked through the O, N, or C atom to a carbon atom in the main chain which last carbon atom is linked to two carbon atoms in the main chain; X is a member of the group consisting of O and NH; and R' is an aliphatic hydrocarbon group of at least two carbon atoms.

MEINDERT DANIUS ROZENBROEK.